United States Patent [19]

Dancy

[11] 3,923,961

[45] Dec. 2, 1975

[54] PRODUCTION OF PHOSPHORUS
[75] Inventor: William B. Dancy, Lakeland, Fla.
[73] Assignee: International Minerals & Chemical Corporation, Libertyville, Ill.
[22] Filed: Oct. 5, 1970
[21] Appl. No.: 78,271

[52] U.S. Cl............................... 423/323; 423/311
[51] Int. Cl.² ...................C01B 25/01; C01B 25/02; C01B 25/04; C01B 15/16
[58] Field of Search ...... 23/108, 223; 423/322, 323, 423/308, 311

[56] References Cited
UNITED STATES PATENTS

| | | | |
|---|---|---|---|
| 1,422,699 | 7/1922 | Guernsey et al.................. | 23/223 X |
| 1,648,146 | 11/1927 | Pevere et al..................... | 23/223 X |
| 1,795,173 | 3/1931 | Lehrecke.......................... | 23/223 X |
| 2,168,312 | 4/1937 | Baily................................ | 23/223 |
| 2,800,396 | 7/1957 | Udy.................................. | 23/223 |
| 2,897,057 | 7/1959 | Burgess............................ | 23/223 |

FOREIGN PATENTS OR APPLICATIONS

| | | | |
|---|---|---|---|
| 1,011,689 | 12/1965 | United Kingdom................. | 23/223 |

Primary Examiner—Oscar R. Vertiz
Assistant Examiner—Gregory A. Heller
Attorney, Agent, or Firm—Peter Andress; James E. Wolber

[57] ABSTRACT

Elemental phosphorus and animal feed grade tricalcium orthophosphate are produced by thermal reduction of monocalcium phosphate in a conventional rotary or fluosolids kiln by admixing the phosphate with a molar excess of carbon, forming the mixture into briquettes or pellets, heating the briquettes rapidly to a temperature of about 2100° to 2400°F. within a period not exceeding about 15 minutes, maintaining the briquettes in a reducing atmosphere, and recovering the phosphorus vapors and the tricalcium orthophosphate as residue. If desired, silica can be added to the mixture so as to reduce substantially all of the phosphorus to elemental form.

19 Claims, No Drawings

PRODUCTION OF PHOSPHORUS

BACKGROUND OF THE INVENTION

The present invention relates to a novel and economical method for the production of elemental phosphorus or a combination of elemental phosphorus and animal feed grade tricalcium orthophosphate from monocalcium phosphate, or a source thereof such as triple superphosphate, by direct thermal reduction under carefully controlled conditions, using carbon as a reducing agent.

Elemental phosphorus has been produced by heating a phosphatic material with a carbonaceous reducing agent and also, if desired, with a siliceous material such as sand. Elemental phosphorus was originally produced on a commercial scale by reacting wet process phosphoric acid with carbon, e.g., charcoal or coke, in a retort at an elevated temperature. The acid was reduced to phosphorus and carbon monoxide in accordance with the equation:

$$4 H_3PO_4 + 10 C = 4 P + 10 CO + 6 H_2O$$

The low production capacity of the individual retort rendered the process uneconomical and it was ultimately displaced by electric furnace methods in which elemental phosphorus was produced directly by the reduction of phosphate rock.

Another related process is disclosed in U.S. Pat. No. 1,648,146 wherein monocalcium phosphate is admixed with carbon (coal or coke) and dried to eliminate moisture. The monocalcium phosphate is then converted to calcium metaphosphate as an intermediate product. Upon heating the calcium metaphosphate and carbon in a retort furnace, the metaphosphate is decomposed to form elemental phosphorus, carbon monoxide, and tricalcium phosphate. Since the intermediate calcium metaphosphate melts under the conditions of the patent, operation of the process is limited to a retort furnace.

Kogyo Kagaku Zasski (Industrial Chemistry Journal), (Japan), Volume 71, No. 3, Pages 367–372, 1968, entitled, "Reduction of Calcium Phosphate Salts with Carbon", reports the results of work when calcium phosphate salts with varied ratios of $CaO:P_2O_5$ (meta-, pyro-, and ortho- salts) were reacted with carbon at temperatures between 700° and 1400°C. It is reported that the following reactions took place:

$$1/2Ca_2P_2O_7 + 5/6C \xrightarrow{980\frac{1}{2}°C} 1/3Ca_3(PO_4)_2 + 1/6P_2 + 5/6CO$$

$$1/3Ca_3(PO_4)_2 + 5/3C \xrightarrow{1400\frac{1}{2}°C} CaO + 1/3P_2 + 5/3CO$$

The data were obtained under laboratory conditions using reagent grade calcium phosphates and pure carbon.

It should be noted that the condensed phosphates undergo transformations at comparatively low temperatures, with meta-phosphate being converted to the pyrophosphate at 890° C. and pyrophosphate being converted to orthophosphate at 980° C. Both of these conversions are accompanied by the melting of the respective phosphates. The melting of the phosphates is a handicap that effectively precludes utilization of the reaction conditions described in the foregoing publication in a conventional kiln on a commercial scale.

SUMMARY OF THE INVENTION

It is, therefore, one object of the present invention to provide a novel and economical method in which monocalcium phosphate can be transformed directly by thermal reduction with a carbonaceous reducing agent, either to elemental phosphorus, or to elemental phosphorus and animal feed grade tricalcium orthophosphate.

It is an additional object of the present invention to provide a method whereby monocalcium phosphate can be reduced with carbon while avoiding the formation of undesirable and readily meltable metaphosphate and pyrophosphate.

It is a further object of this invention to provide a method for the reduction of monocalciumm phosphate adapted to utilize conventional types of calcination equipment.

In one embodiment, the present invention provides a method for the production of elemental phosphorus and tricalcium orthophosphate by the thermal reduction of monocalcium phosphate comprising the steps of: forming an intimate mixture of monocalcium phosphate and a carbonaceous reducing agent, and the amount of carbon being sufficient to provide from about 20% to about 50% molar excess of that required for reaction with the elemental phosphorus to be liberated; rapidly heating the mixture prepared above to raise the temperature thereof between about 2100° F. and about 2400° F. within a period of time not exceeding about 15 minutes; continuing heating the mixture at said temperature range in a reducing atmosphere to convert the monocalcium phosphate to elemental phosphorus and tricalcium orthophosphate; and recovering the elemental phosphorus and the tricalcium orthophosphate.

In an alternate embodiment, the present invention provides a method for the production of elemental phosphorus by the thermal reduction of monocalcium phosphate comprising the steps of: forming an intimate mixture of monocalcium phosphate, a carbonaceous reducing agent, and silica, the carbon being sufficient to provide from about 20% to about 50% molar excess of that required for reaction with the elemental phosphorus to be liberated and the amount of silica being such that the $SiO_2/CaO$ mol ratio is at least greater than about 1; rapidly heating the mixture prepared above to raise the temperature thereof between about 2100° F. and about 2400° F. within a period of time not exceeding about 15 minutes; continuing heating the mixture at said temperature range in a reducing atmosphere to convert the monocalcium phosphate substantially entirely to elemental phosphorus and calcium silicate; and recovering the elemental phosphorus.

DESCRIPTION OF THE PREFERRED EMBODIMENTS

The method of this invention employs selected operating conditions whereby the formation of the undesirable and low melting calcium metaphosphate and pyrophosphate, which ordinarily takes place in the presence of carbon if the teachings of the prior art are followed, is avoided. Under the selected and controlled conditions of the process of the invention, the quantity of low melting condensed calcium phosphates is held at a sufficiently low level so that any liquid formed is promptly absorbed and removed by the other solid reactants present in the reaction mixture, such as tricalcium phosphate, carbon, silica and the like. The process readily may be practiced employing triple superphosphate as the source of monocalcium phosphate. A typical triple super-phosphate may contain about 47 to 49% $P_2O_5$ and about 18 to 21% CaO.

Although the application of heat per se to monocalcium phosphate will ordinarily convert it to the metaphosphate, it has been determined that a molar excess of carbon relative to the amount of calcium phosphate prevents any calcium metaphosphate or pyrophosphate from melting and interfering with the operation of a conventional type kiln provided the phosphate-carbon reaction mixture is heated rapidly to the reaction temperature of from about 2100° F. to about 2400° F. The rapid heating, which is necessary to the success of the process, must take place within a period not exceeding about 15 minutes, and preferably within about 5 minutes.

Under the conditions of this invention, i.e., rapid heating in a neutral or reducing atmosphere with carbon present, two mols of phosphorus which are present in one mol of calcium monophosphate yields 4/3 mols of elemental phosphorus and 2/3 mol of phosphorus as tricalcium orthophosphate.

The reduction of this invention may be performed in a conventional rotary or fluosolids type kiln. Sufficient retention time within the kiln should be allowed at the reduction temperature to liberate at least about 50% and preferably at least about 65% of the phosphorus in the charge as elemental phosphorus. This time period will ordinarily be above about 15 minutes, and may extend up to about 2 hours.

The heating of the charge in the kiln is carried out under a neutral or reducing atmosphere, i.e., atmosphere free of oxygen or other oxidizing agent. Oxygen is readily excluded from the combustion gases by careful control of the air-to-fuel ratio in the kiln combustion zone so that the combustion gases contain at least a small amount of carbon monoxide.

The elemental phosphorus volatilized in the reduction is recovered with the other gases leaving the kiln, utilizing well-known recovery methods. Any of those methods conventionally employed in the manufacture of phosphorus by electric furnace reduction methods, such as condensation, readily may be employed in the practice of this invention.

In addition to elemental phosphorus, animal feed grade tricalcium orthophosphate is co-produced as a solid residue in one embodiment of this invention. This material is defluorinated in the process and can be utilized directly as animal feed. The calcium content of the product generally will range between about 23% and about 28%, and the phosphorus content between about 11% and about 17%. The elemental P/F weight ratio readily meets the minimum commercial specification of 100 for animal feed materials. If desired, any unreacted carbon can be burned off by crushing and calcining the kiln residue. The theoretical overall phosphorus recovery in the gas stream and kiln residue is about 100%.

The starting material may be particulate monocalcium phosphate or fertilizer grade triple superphosphate which has been screened to a desirable particle size range, preferably to about minus 20 mesh (Tyler). Triple superphosphate can be produced from phosphate rock and then processed to elemental phosphorus, or to elemental phosphorus and tricalcium orthophosphate, as previously described. The phosphate may be produced by digesting phosphate rock with sufficient phosphoric acid (e.g., wet process acid) to cause the reaction mixture to have a $CaO/P_2O_5$ mol ratio of not greater than about 1. Experience has shown that the recovery of elemental phosphorus is adversely affected if the $CaO/P_2O_5$ mol ratio is substantially greater than about 1. This ratio can be reduced to a value ranging from just below 1 to a value just above the ratio at which the charge will melt in the kiln, i.e., the ratio will generally vary from about 0.7 to about 1.3. It is economically advantageous to keep the ratio in the charge at about 1.

The carbonaceous reducing agent employed may be any readily available form of free carbon, as for example, industrial grade coke, metallurgical grade coke, petroleum coke, or bituminous coal. The amount of carbon employed in admixture with the phosphate to be reduced is sufficient to react with the liberated phosphorus, and to provide from about 20% to about 50% molar excess of free carbon. For example, if 70% of the phosphorus of the feed is to be liberated as phosphorus, sufficient carbon is employed to provide from about 20 to about 50% excess over that required for reaction with 70% of the phosphorus initially present. Such proportions of carbon prevent melting in the kiln, arising from formation of meta-phosphates and pyrophosphates, and accelerate the rate of the various reactions taking place.

The kiln charge may be prepared by simply admixing particulate calcium monophosphate, carbon and silica, if used, of the proper size. Alternatively, phosphate rock may be dry milled with carbon and silica, if used, e.g., to a fineness of at least about 50% minus 200 mesh particles, and sufficient phosphoric acid, e.g., 25 to 54% $P_2O_5$ acid, is then added to the mill discharge to adjust the $CaO/SiO_2$ mol ratio to the proper value, such as to a value of about 1.

Desirably, the monocalcium phosphate-carbon charge is briquetted or pelleted before feeding to a kiln, in order to avoid excessive contamination of the phosphorus-bearing gas stream with entrained fines. The briquetting or pelleting may be accomplished by conventional procedures, with or without a small amount of a suitable binder. The briquettes or pellets are most preferably dried, for example, at a temperature of about 160° F. to about 240° F. to eliminate excess free moisture before subjecting them to the rapid heating step.

In accordance with another aspect of the invention, the conversion of the calcium phosphate, while maintaining the special controlled conditions previously described, may be carried out so as to recover virtually all of the phosphorus present as elemental phosphorus, with minimal formation of tricalcium orthophosphate. This is accomplished by adding silica to the kiln charge. The silica may be in the form of sand or silica flour, or the tailings from a phosphate rock flotation operation. In the presence of the silica, the tricalcium orthophosphate formed is reduced to elemental phosphorus, the calcium being taken up by the silica with formation of calcium silicate, in accordance with the equation:

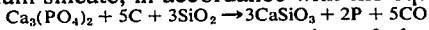
$$Ca_3(PO_4)_2 + 5C + 3SiO_2 \rightarrow 3CaSiO_3 + 2P + 5CO$$

In this way the overall conversion of phosphorus in the starting material is increased from about 66% to about 90% or higher. Advantageously, the molar ratio of silica employed is adjusted so that the $SiO_2/CaO$ mol ratio is at least greater than about 1, to compensate for impurities in the silica and imperfect mixing. Excess silica does not adversely affect the reaction. The silica may be incorporated in the reduction mixture together with the carbon. The kiln residue which is principally calcium silicate, is discarded.

The following examples are illustrative of the practice of this invention but are not intended to limit the scope of the invention.

EXAMPLE I

Two hundred grams of fertilizer grade triple superphosphate (about 47% $P_2O_5$ and about 19% CaO) were intimately mixed with 48 grams of pulverized metallurgical grade coke and 40 cubic centimeters of water. Two 100 gram portions of the mixture were briquetted at 10 tons pressure on a hydraulic press. The green briquettes were dried overnight at about 220° F. to remove excess water. One briquette, i.e., briquette A, was placed in a furnace preheated to 2225° F., and was fired for 2 hours under a nitrogen atmosphere. The residue was removed and was analyzed for CaO, $P_2O_5$, and F. Temperature of the furnace was increased to 2350° F. and the other briquette, i.e., briquette B, was fired for 2 hours under a nitrogen atmosphere. The residue was removed and analyzed for CaO, $P_2O_5$, and F.

Tests in Examples II, III and IV were run at the same time as the test in Example I to be sure that identical drying time, firing time, and temperature prevailed. The results of Example I were as follows:

| Sample | Analyses of Residue, Wt. % | | | % P Evolved as Elemental Phosphorus Vapor | P/F Wt. Ratio |
|---|---|---|---|---|---|
| | CaO | $P_2O_5$ | F | | |
| A | 35.86 | 40.02 | 0.03 | 55 | 580 |
| B | 38.98 | 35.48 | 0.04 | 63 | 390 |

EXAMPLE II

The procedure of Example I was repeated except that the amount of pulverized coke was increased to 58 grams. The results were as follows:

| Sample | Analyses of Residue, Wt. % | | | % P Evolved as Elemental Phosphorus Vapor | P/F Wt. Ratio |
|---|---|---|---|---|---|
| | CaO | $P_2O_5$ | F | | |
| A | 34.34 | 38.22 | 0.03 | 55.4 | 560 |
| B | 35.25 | 26.16 | 0.04 | 70.3 | 290 |

EXAMPLE III

The procedure of Example I was repeated except that the amount of pulverized coke was increased to 68 grams. The results were as follows:

| Sample | Analyses of Residue, Wt. % | | | % P Evolved as Elemental Phosphorus Vapor | P/F Wt. Ratio |
|---|---|---|---|---|---|
| | CaO | $P_2O_5$ | F | | |
| A | 32.61 | 27.81 | 0.05 | 66.1 | 240 |
| B | 35.54 | 28.31 | 0.06 | 68.1 | 210 |

EXAMPLE IV

The procedure of Example I was repeated except that the coke was replaced by 100 grams of low grade bituminous coal (48% fixed carbon). The results were as follows:

| Sample | Analyses of Residue, Wt. % | | | % P Evolved as Elemental Phosphorus Vapor | P/F Wt. Ratio |
|---|---|---|---|---|---|
| | CaO | $P_2O_5$ | F | | |
| A | 32.01 | 27.10 | 0.06 | 66.1 | 200 |
| B | 36.06 | 33.06 | 0.09 | 63.3 | 160 |

While all samples in Examples I to IV remained particulate, the tendency to tackiness lessened as the coke proportion was increased.

EXAMPLE V

This experiment, as well as the experiments reported under Examples VI to VIII, were run to demonstrate that the addition of silica in an amount to produce a $CaO:SiO_2$ mol ratio in the kiln charge higher than one is effective to produce a greater quantity of elemental phosphorus. One hundred grams of triple superphosphate were mixed with 25 grams of silica flour, 30 grams of pulverized metallurgical grade coke and 20 cubic centimeters of water. After thorough mixing, 100 grams were briquetted and processed as described in Example I.

| Analysis of Residue, Wt. % | | % P Evolved as Elemental Phosphorus Vapor |
|---|---|---|
| CaO | $P_2O_5$ | |
| 22.89 | 6.05 | 89.4 |

EXAMPLE VI

The procedure of Example V was repeated except that the firing temperature was increased to 2350° F. The results were as follows:

| Analysis of Residue, Wt. % | | % P Evolved as Elemental Phosphorus Vapor |
|---|---|---|
| CaO | $P_2O_5$ | |
| 20.02 | 3.86 | 92.3 |

EXAMPLE VII

The procedure of Example VI was repeated employing, as the silica addition, the tailings from a phosphate rock flotation operation. The results were as follows:

| Analysis of Residue, Wt. % | | % P Evolved as Elemental Phosphorus Vapor |
|---|---|---|
| CaO | $P_2O_5$ | |
| 26.70 | 7.62 | 88.6 |

EXAMPLE VIII

The procedure of Example V was repeated except that the coke was replaced with 50 grams of low grade metallurgical coal (cf. Example IV), and the firing temperature was 2350° F. The results were as follows:

| Analysis of Residue, Wt. % | | % P Evolved as Elemental Phosphorus Vapor |
|---|---|---|
| CaO | $P_2O_5$ | |
| 23.26 | 3.77 | 93.6 |

EXAMPLE IX

A mixture of phosphate rock, carbon in the form of metallurgical grade coke, and silica (sand) is dry milled to a fineness of about 50% minus 200 mesh. The amount of fixed carbon is 2.5 mols per mol of phosphorus in the feed charge. The amount of silica corresponds to a $SiO_2/CaO$ mol ratio of about 1. The mill discharge is treated with an amount of wet process phosphoric acid (25% to 54% $P_2O_5$) sufficient to obtain a $CaO/P_2O_5$ mol ratio of about one. The mixture is treated in a pug mill and then fed to a briquetting machine. The resulting briquettes are dried in a rotary drier at 200° F. and the dried briquettes are fed into a rotary kiln in which a bed temperature of about 2400° F. is obtained in about 5 minutes. The briquettes are held in the kiln at this temperature for about 30 minutes. The evolved phosphorus and carbon monoxide vapors are led to a condenser and the phosphorus recovered, the recovery being approximately 90%. The gases are additionally scrubbed to remove traces of fluorine and the predominately calcium silicate residue is discarded.

EXAMPLE X

A mixture of phosphate rock and carbon (metallurgical grade coke) is dry milled to a fineness of about 50% minus 200 mesh. The amount of fixed carbon is 2.5 mols per mol of phosphorus in the feed charge. The mill discharge is treated with wet process phosphoric acid (25% to 54% $P_2O_5$) sufficient to obtain in the kiln charge a $CaO/P_2O_5$ mol ratio of about one. The mixture is treated in a pug mill and then fed to a briquetting machine. The resulting briquettes are dried in a rotary drier at 200° F. and the dried briquettes are fed into a rotary kiln in which a bed temperature of about 2400° F. is obtained in about five minutes. The briquettes are held in the kiln at this temperature for about 30 minutes. The evolved phosphorus and carbon monoxide vapors are led to a condenser and the phosphorus recovered, the recovery being about 90%. The gases are additionally scrubbed to remove traces of fluorine. The tricalcium orthophosphate is recovered, is substantially free from fluorine and is suitable for animal feed.

Since the variations of the invention will be apparent to those skilled in the art, it is intended that this invention be limited only by the scope of the appended claims.

I claim:

1. Method for the production of elemental phosphorus and tricalcium orthophosphate by the thermal reduction of monocalcium phosphate comprising the steps of:
   a. forming an intimate mixture of monocalcium phosphate and a carbonaceous reducing agent, the amount of carbon being sufficient to provide from about 20% to about 50% molar excess of that equivalent for reaction with the elemental phosphorus to be liberated in step (c);
   b. rapidly heating the mixture prepared in step (a) to a temperature between about 2100° F. and about 2400° F. within a period of time not exceeding about 15 minutes to substantially avoid the formation of calcium metaphosphate and calcium pyrophosphate as intermediates;
   c. continuing heating the mixture at said temperature range in a neutral or reducing atmosphere to convert the mono-calcium phosphate to elemental phosphorus and tricalcium ortho-phosphate; and
   d. recovering the elemental phosphorus and the tricalcium orthophosphate.

2. The method of claim 1 in which the mixture formed in step (a) is briquetted or pelleted prior to heating in step (b).

3. The method of claim 2 in which the heating is performed in a rotary kiln.

4. The method of claim 2 in which the tricalcium orthophosphate formed is of animal feed grade.

5. The method of claim 2 in which the monocalcium phosphate is fertilizer grade triple superphosphate.

6. The method of claim 2 in which the monocalcium phosphate starting material is obtained by the reaction of phosphate rock and phosphoric acid.

7. Method for the production of elemental phosphorus by the thermal reduction of monocalcium phosphate comprising the steps of:
   a. forming an intimate mixture of monocalcium phosphate, a carbonaceous reducing agent, and silica, the carbon being sufficient to provide from about 20% to about 50% molar excess of that equivalent for reaction with elemental phosphorus to be liberated in step (c) and the amount of silica being such that the $SiO_2CaO$ mol ratio is at least greater than about 1;
   b. rapidly heating the mixture prepared in step (a) to a temperature between about 2100° F. and about 2400° F. within a period of time not exceeding about 15 minutes to substantially avoid the formation of calcium metaphosphate and calcium pyrophosphate as intermediates;

c. continuing heating the mixture at said temperature range in a neutral or reducing atmosphere to convert the mono-calcium phosphate substantially entirely to elemental phosphorus and calcium silicate; and d. recovering the elemental phosphorus.

8. The method of claim 7 in which the mixture formed in step (a) is briquetted or pelleted prior to heating in step (b).

9. The method of claim 8 in which the heating is performed in a rotary kiln.

10. The method of claim 8 in which the monocalcium phosphate is fertilizer grade triple superphosphate.

11. The method of claim 8 in which the silica is composed of tailings from phosphate rock flotation operations.

12. The method of claim 8 in which the monocalcium phosphate starting material is obtained by the reaction of phosphate rock and phosphoric acid.

13. Method for the production of elemental phosphorus and tricalcium orthophosphate from phosphate rock by thermal reduction comprising the steps of:

a. forming an intimate mixture of phosphate rock and a carbonaceous reducing agent, the amount of carbon being sufficient to provide from about 20% to about 50% molar excess of that equivalent for reaction with elemental phosphorus to be liberated in step (d);

b. admixing the mixture produced in step (a) with a sufficient amount of phosphoric acid to form monocalcium phosphate;

c. rapidly heating the mixture prepared in step (b) to a temperature between about 2100° F. and about 2400° F. within a period of time not exceeding about 15 minutes to substantially avoid the formation of calcium metaphosphate and calcium pyrophosphate as intermediates:

d. continuing heating the mixture at said temperature range in a reducing atmosphere to convert the monocalcium phosphate to elemental phosphorus and tricalcium orthophosphate; and e. recovering the elemental phosphorus and the tricalcium orthophosphate.

14. The method of claim 13 in which the mixture formed in steps (a) and (b) is briquetted or pelleted prior to heating in step (c).

15. The method of claim 14 in which the heating is performed in a rotary kiln.

16. The method of claim 15 in which the tricalcium orthophosphate formed is of animal feed grade.

17. Method for the production of elemental phosphorus from phosphate rock by thermal reduction comprising the steps of:

a. forming an intimate mixture of phosphate rock, a carbonaceous reducing agent, and silica, the amount of carbon being sufficient to provide from about 20% to about 50% molar excess of that equivalent for reaction with elemental phosphorus to be liberated in step (d) and the amount of silica being such that the $SiO_2/CaO$ mol ratio is at least greater than about 1;

b. admixing the mixture produced in step (a) with a sufficient amount of phosphoric acid to form monocalcium phosphate;

c. rapidly heating the mixture prepared in step (b) to a temperature between 2100° F. and about 2400° F. within a period of time not exceeding about 15 minutes to substantially avoid the formation of calcium metaphosphate and calcium pyrophosphate as intermediates;

d. continuing heating the mixture at said temperature range in a reducing atmosphere to convert the monocalcium phosphate substantially entirely to elemental phosphorus and calcium silicate; and e. recovering the elemental phosphorus.

18. The method of claim 17 in which the mixture formed in steps (a) and (b) is briquetted or pelleted prior to heating in step (c).

19. The method of claim 18 in which the heating is performed in a rotary kiln.

* * * * *